July 4, 1961 A. H. DICKINSON 2,991,010
ELECTRONIC COMPARATOR
Filed Dec. 31, 1954 18 Sheets-Sheet 1

INVENTOR.
ARTHUR H. DICKINSON
BY [signature]
ATTORNEY

July 4, 1961 A. H. DICKINSON 2,991,010

ELECTRONIC COMPARATOR

Filed Dec. 31, 1954 18 Sheets-Sheet 2

REGISTER A — TENS ORDER

INVENTOR.
ARTHUR H. DICKINSON
BY [signature]
ATTORNEY

July 4, 1961 A. H. DICKINSON 2,991,010

ELECTRONIC COMPARATOR

Filed Dec. 31, 1954 18 Sheets-Sheet 3

INVENTOR.
ARTHUR H. DICKINSON

BY [signature]

ATTORNEY

REGISTER A —— UNITS ORDER

INVENTOR.
ARTHUR H. DICKINSON
BY [signature]
ATTORNEY

July 4, 1961 | A. H. DICKINSON | 2,991,010

ELECTRONIC COMPARATOR

Filed Dec. 31, 1954 | 18 Sheets-Sheet 5

INVENTOR.
ARTHUR H. DICKINSON

BY [signature]

ATTORNEY

July 4, 1961 A. H. DICKINSON 2,991,010

ELECTRONIC COMPARATOR

Filed Dec. 31, 1954 18 Sheets-Sheet 6

INVENTOR.
ARTHUR H. DICKINSON

BY [signature]

ATTORNEY

July 4, 1961 A. H. DICKINSON 2,991,010
ELECTRONIC COMPARATOR
Filed Dec. 31, 1954 18 Sheets-Sheet 7

INVENTOR.
ARTHUR H. DICKINSON
BY
ATTORNEY

July 4, 1961 A. H. DICKINSON 2,991,010

ELECTRONIC COMPARATOR

Filed Dec. 31, 1954

18 Sheets-Sheet 8

INVENTOR.

ARTHUR H. DICKINSON

BY [signature]

ATTORNEY

COMPARISON CONTROL UNIT

*INVENTOR.*
ARTHUR H. DICKINSON
*BY* [signature]
ATTORNEY

INVENTOR.
ARTHUR H. DICKINSON

BY [signature]

ATTORNEY

July 4, 1961 A. H. DICKINSON 2,991,010

ELECTRONIC COMPARATOR

Filed Dec. 31, 1954 18 Sheets-Sheet 11

INVENTOR.
ARTHUR H. DICKINSON
BY [signature]
ATTORNEY

July 4, 1961  A. H. DICKINSON  2,991,010

ELECTRONIC COMPARATOR

Filed Dec. 31, 1954  18 Sheets-Sheet 12

INVENTOR.
ARTHUR H. DICKINSON
BY [signature]
ATTORNEY

July 4, 1961 A. H. DICKINSON 2,991,010

ELECTRONIC COMPARATOR

Filed Dec. 31, 1954 18 Sheets-Sheet 13

INVENTOR.
ARTHUR H. DICKINSON
BY [signature]
ATTORNEY

July 4, 1961 A. H. DICKINSON 2,991,010
ELECTRONIC COMPARATOR
Filed Dec. 31, 1954 18 Sheets-Sheet 14

INVENTOR.
ARTHUR H. DICKINSON
BY [signature]
ATTORNEY

July 4, 1961 A. H. DICKINSON 2,991,010

ELECTRONIC COMPARATOR

Filed Dec. 31, 1954 18 Sheets-Sheet 15

*INVENTOR.*
ARTHUR H. DICKINSON
*BY* [signature]
ATTORNEY

July 4, 1961 A. H. DICKINSON 2,991,010

ELECTRONIC COMPARATOR

Filed Dec. 31, 1954 18 Sheets-Sheet 16

INVENTOR.
ARTHUR H. DICKINSON

BY [signature]

ATTORNEY

July 4, 1961 A. H. DICKINSON 2,991,010
ELECTRONIC COMPARATOR
Filed Dec. 31, 1954 18 Sheets-Sheet 17

INVENTOR.
ARTHUR H. DICKINSON
BY [signature]
ATTORNEY

INVENTOR.
ARTHUR H. DICKINSON
BY [signature]
ATTORNEY

United States Patent Office 2,991,010
Patented July 4, 1961

2,991,010

ELECTRONIC COMPARATOR

Arthur H. Dickinson, Greenwich, Conn., assignor to International Business Machines Corporation, New York, N.Y., a corporation of New York Filed Dec. 31, 1954, Ser. No. 479,019
8 Claims. (Cl. 235—177)

Figure 1A:
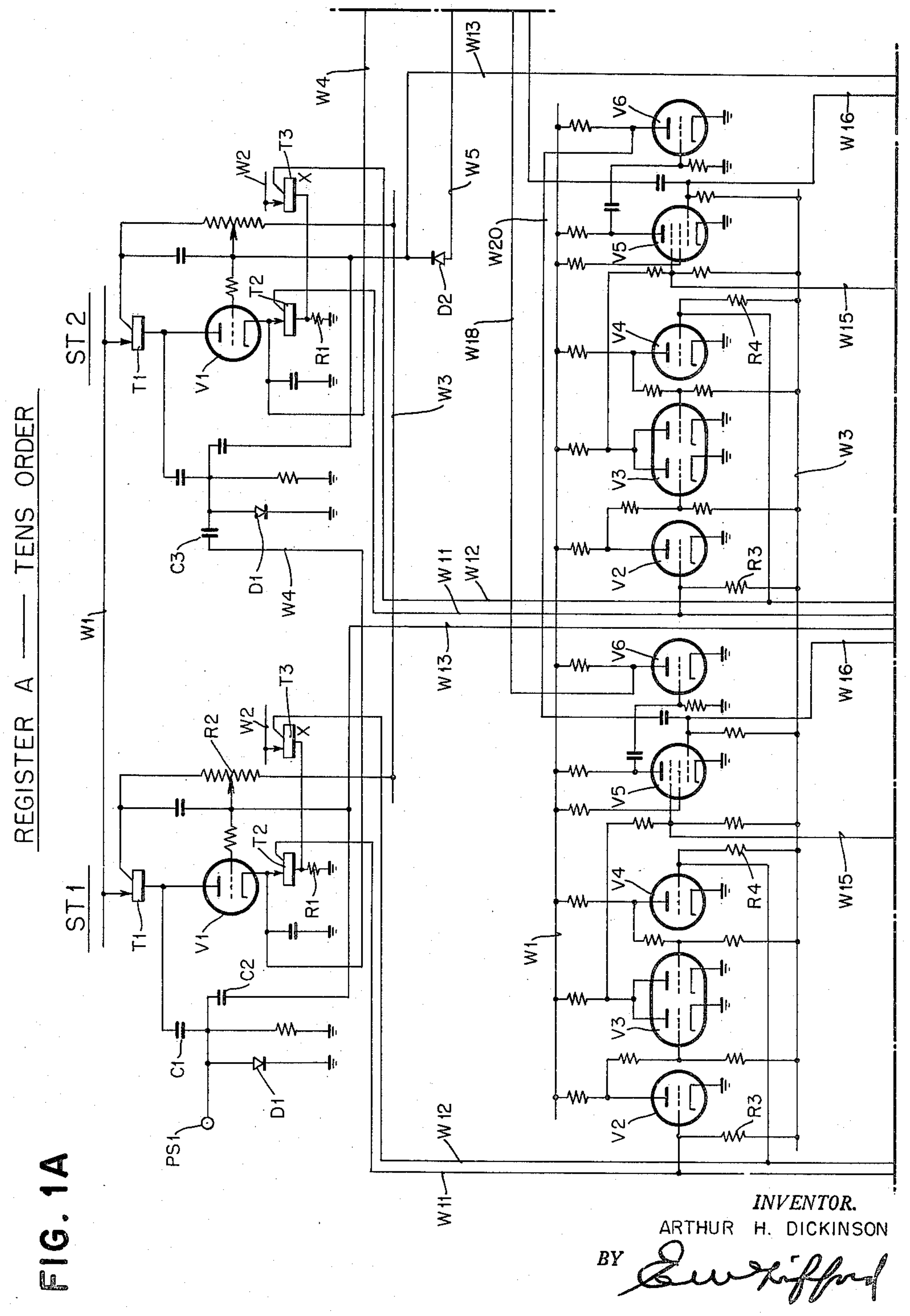

This invention relates to machines for processing data and more particularly to means for determining the relative magnitude of data.

The principal objective of the invention is to provide an improved means of determining the relative magnitude of data entered in a plurality of registers or storage devices capable of retaining the data in either a direct numerical representation or in code form such as in the binary system of arithmetic.

An object is to provide an electronic comparing circuit of improved form.

Another object is to provide an electronic comparing circuit in which semi-conductor translating devices are used to intercouple the stages of the registers to be compared.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1A to 1I comprise a wiring diagram of a preferred embodiment of the invention.

Figure 1B:
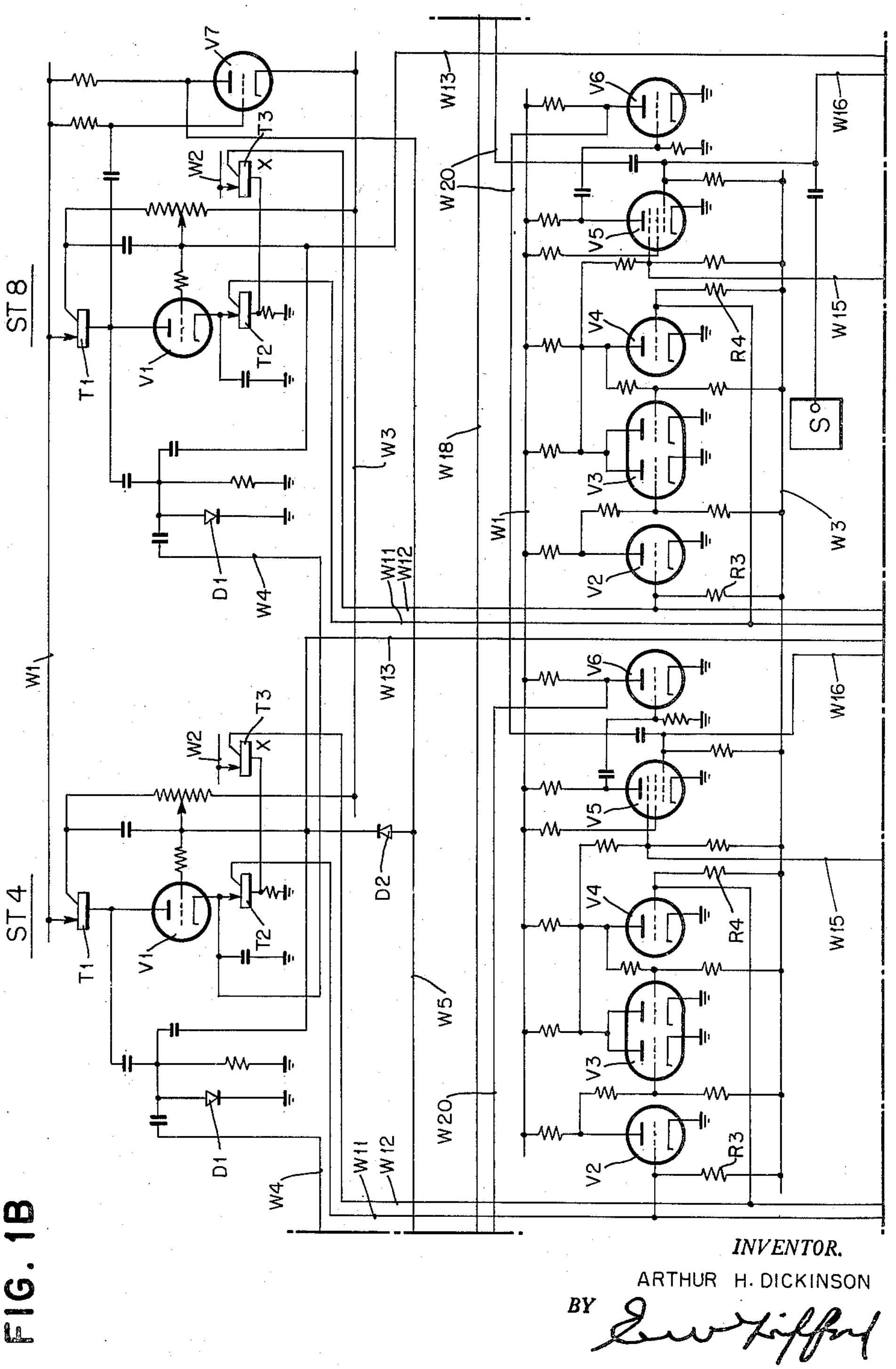
Figure 1C:
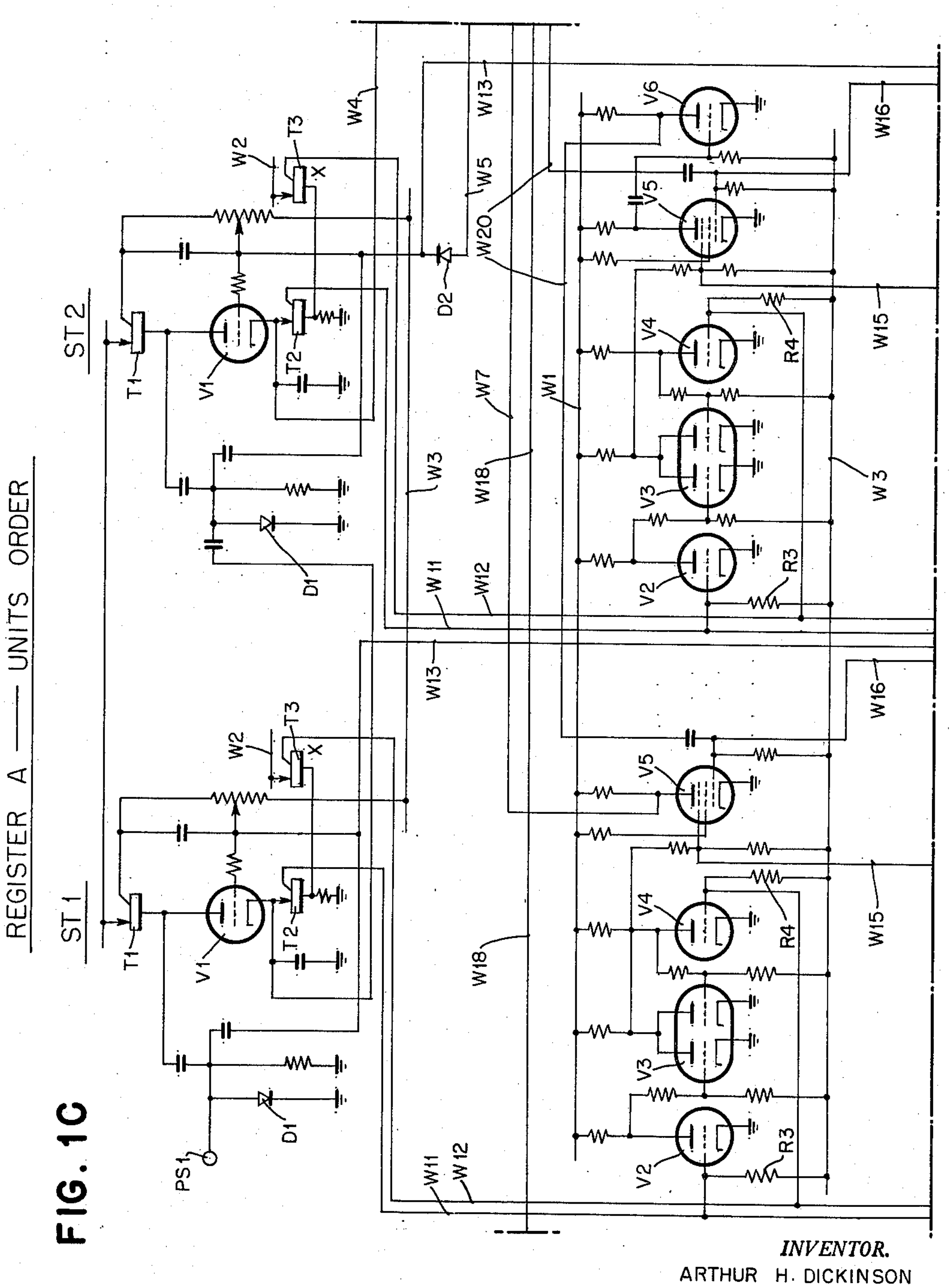
Figure 1D:
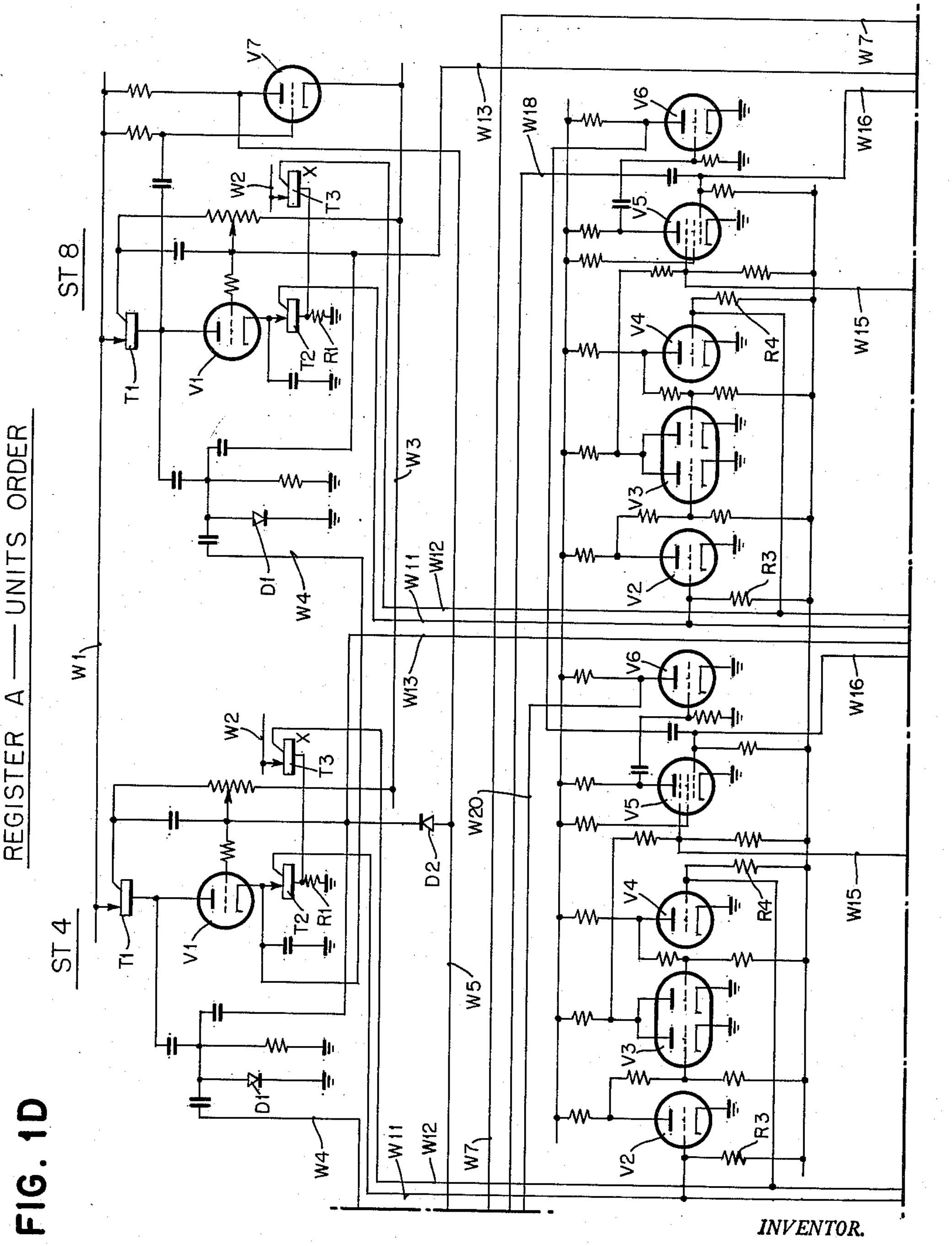
Figure 1E:
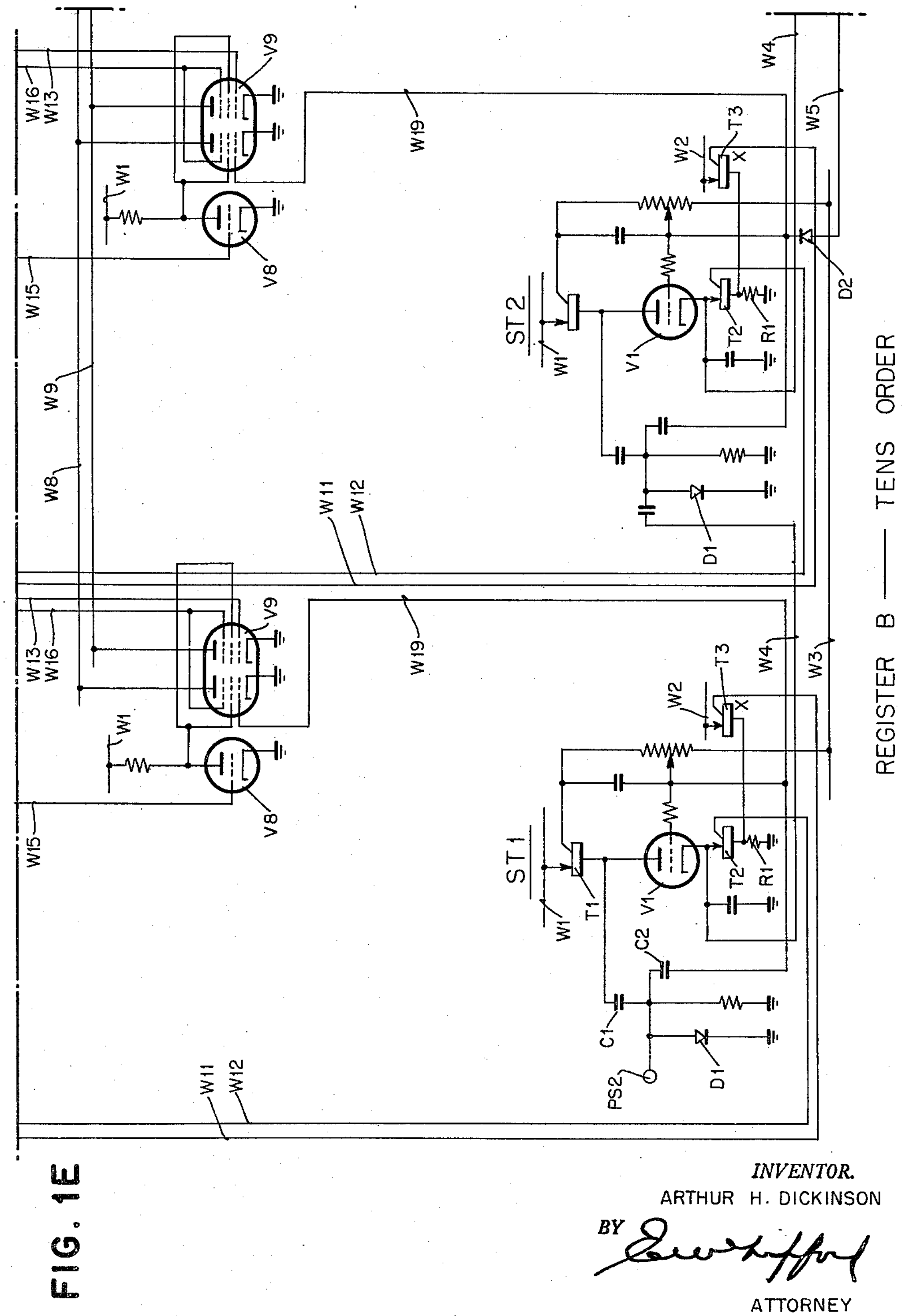
Figure 1F:
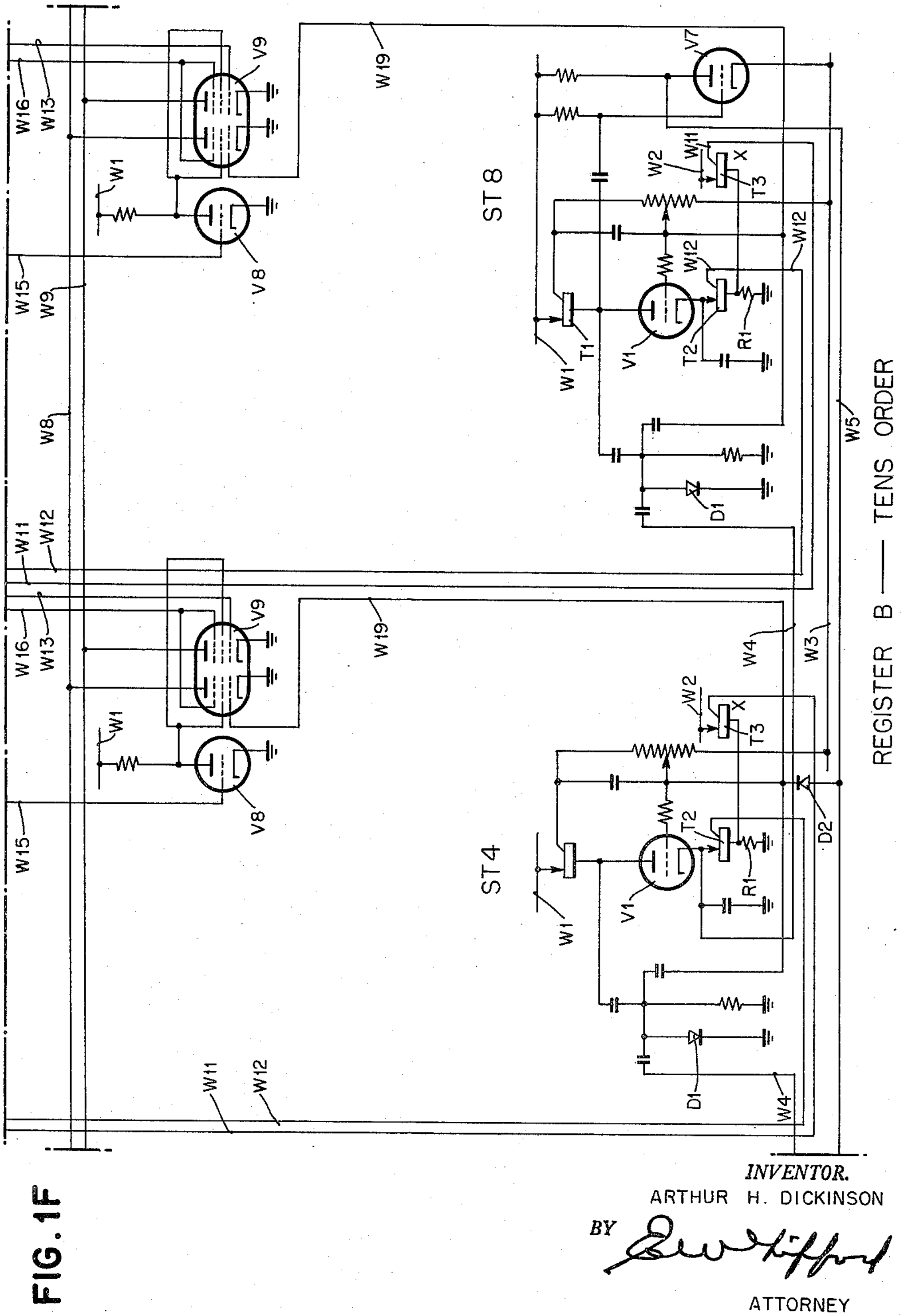
Figure 1G:
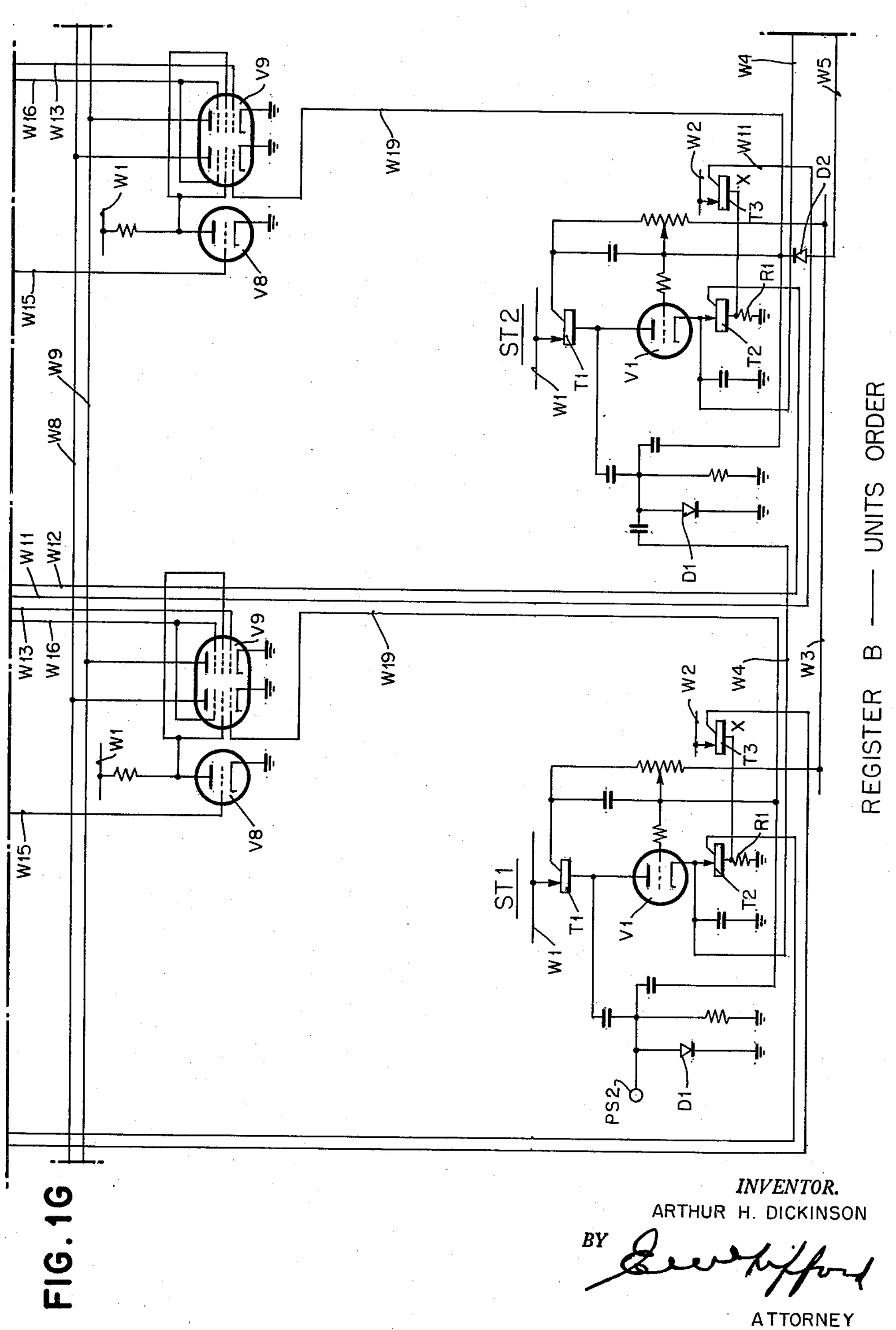
Figure 1H:
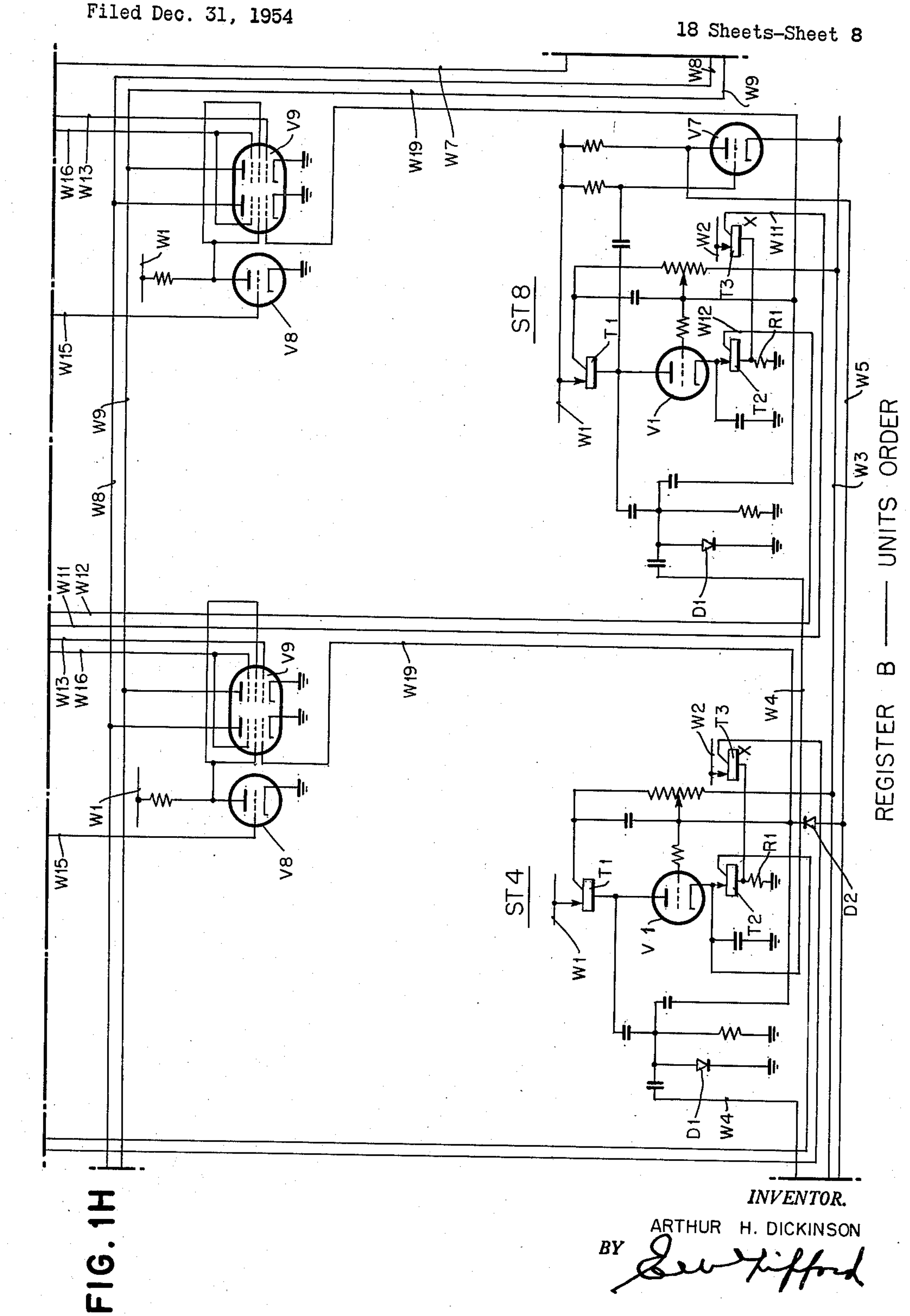
Figure 1I:
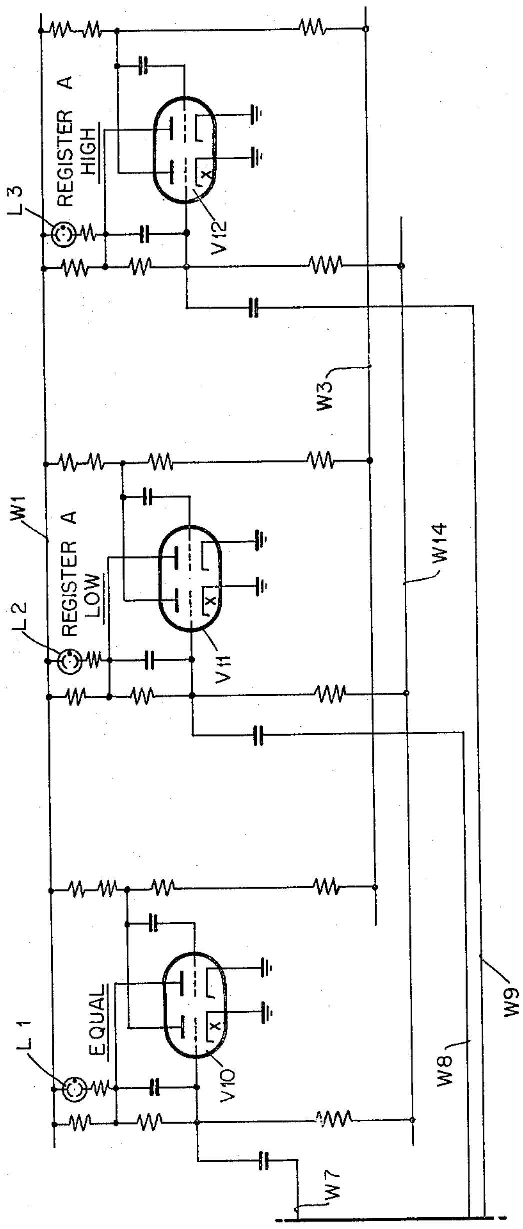
Figure 2A:
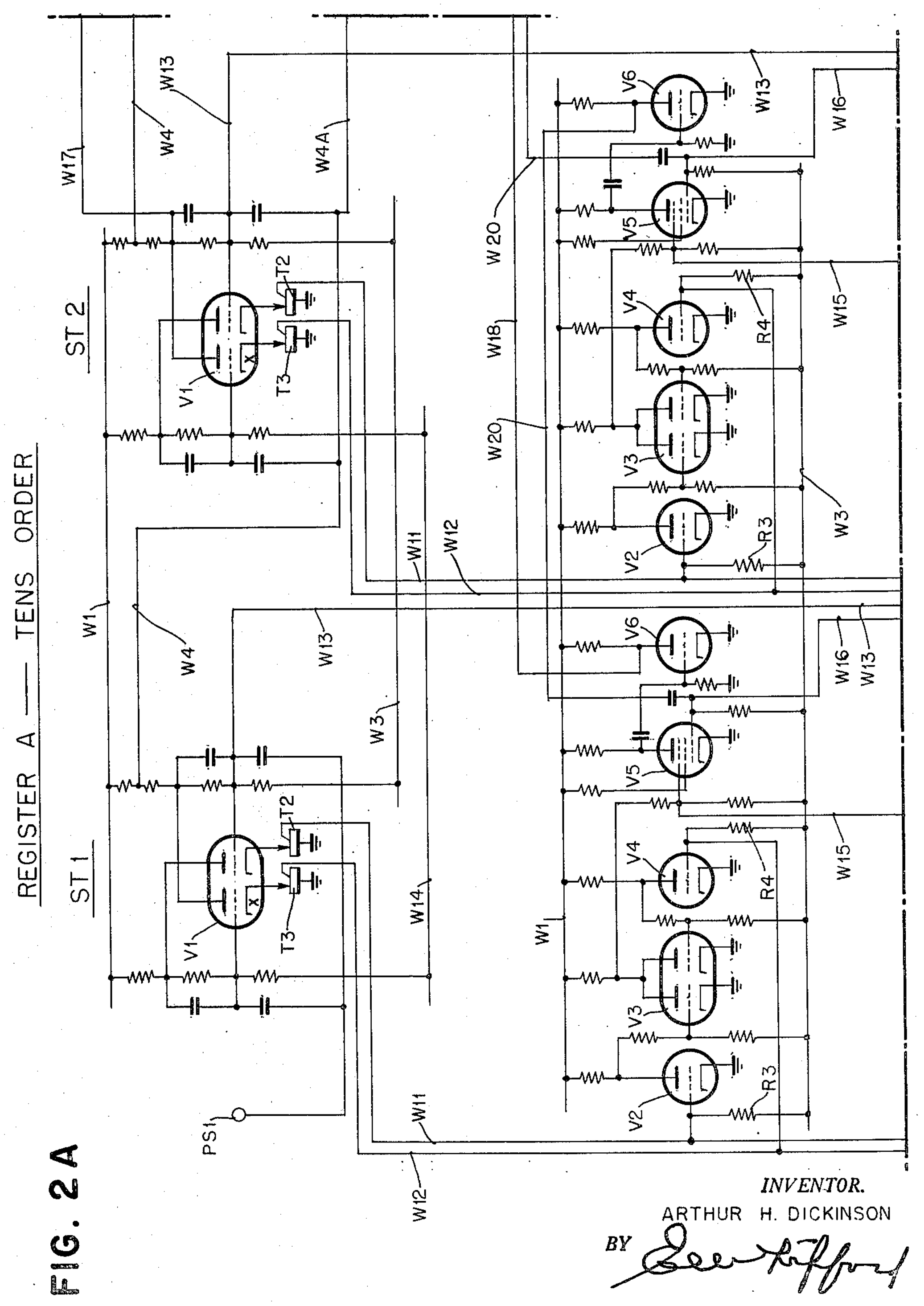
Figure 2B:
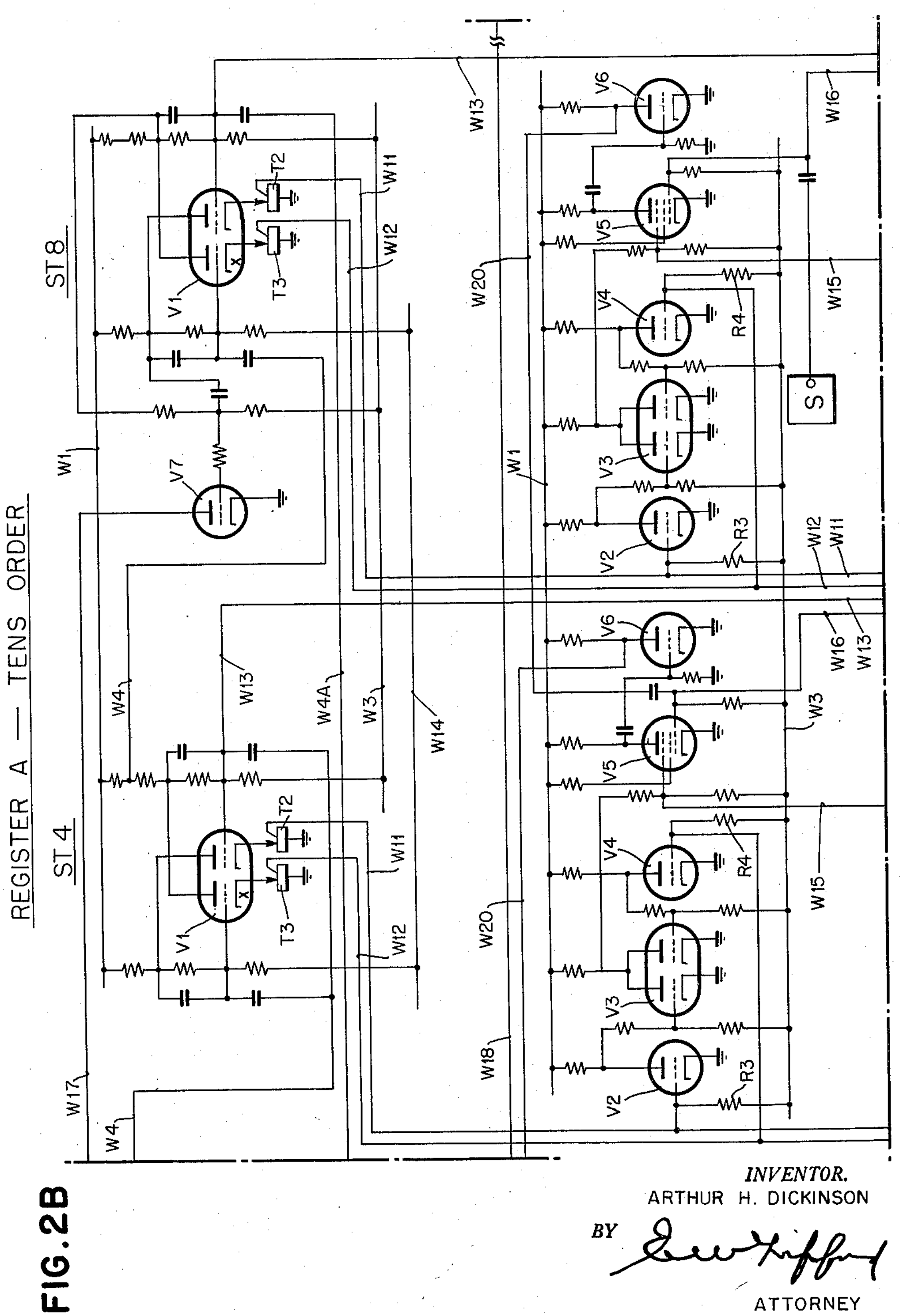
Figure 2C:
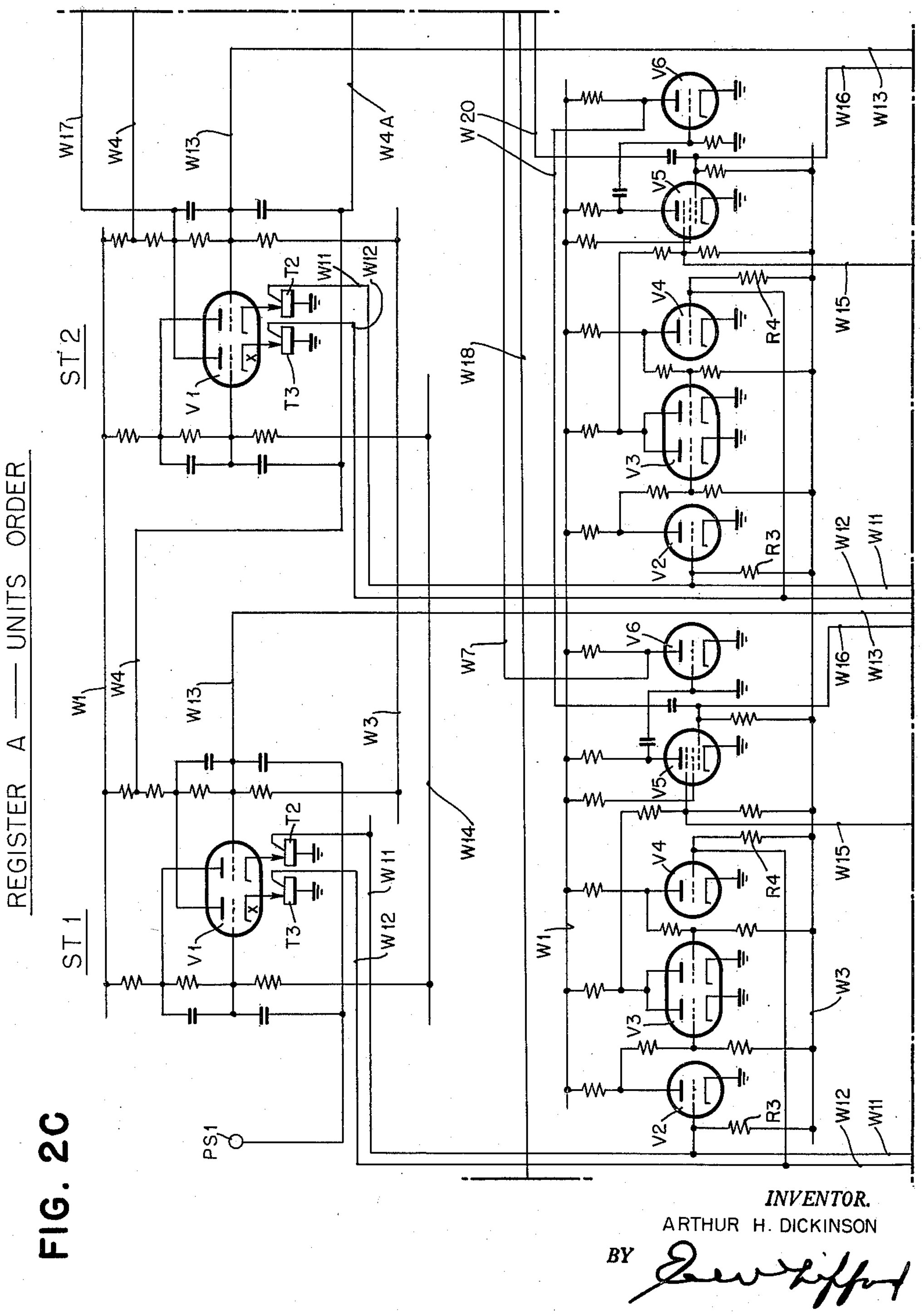
Figure 2D:
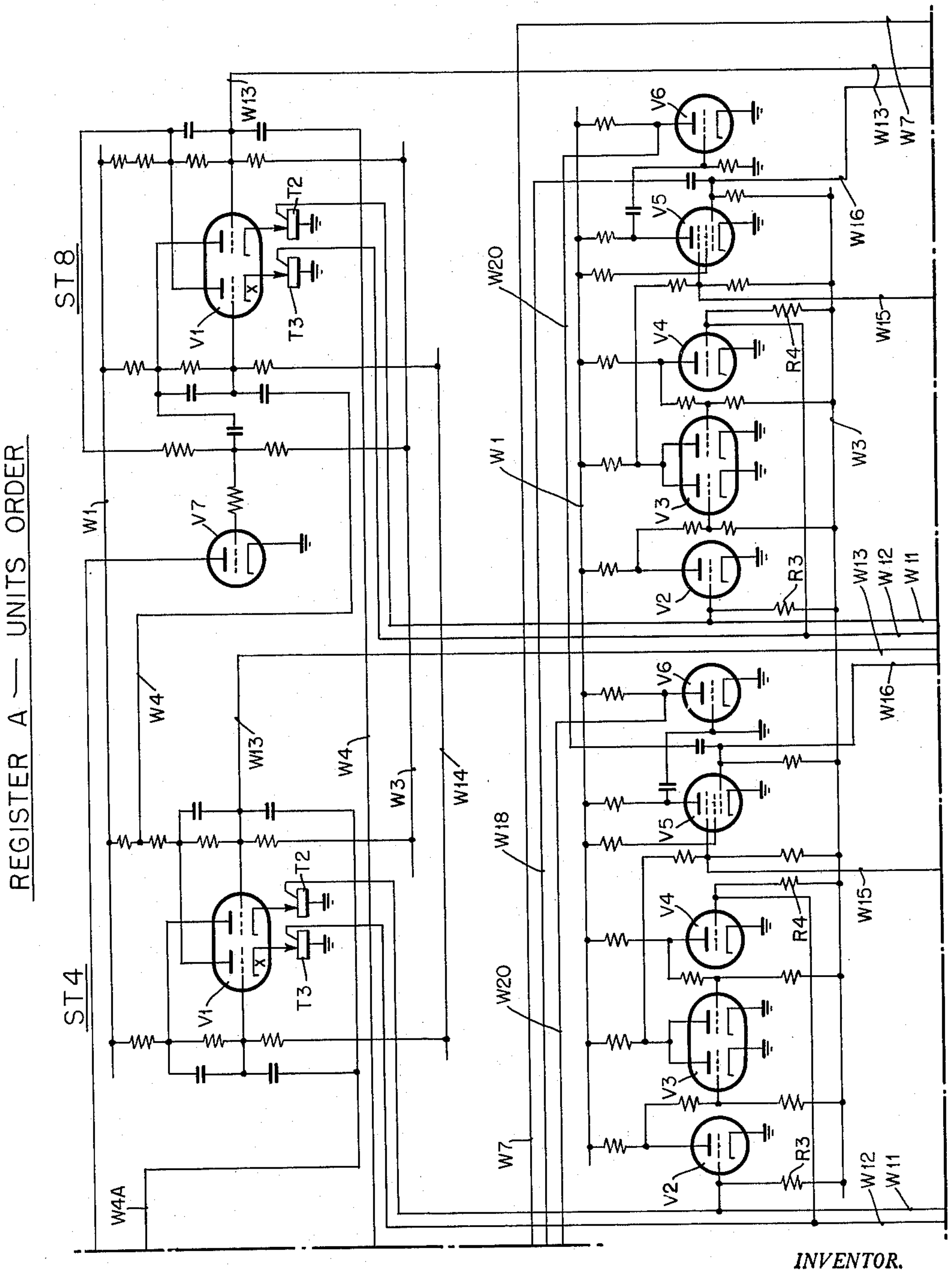
Figure 2E:
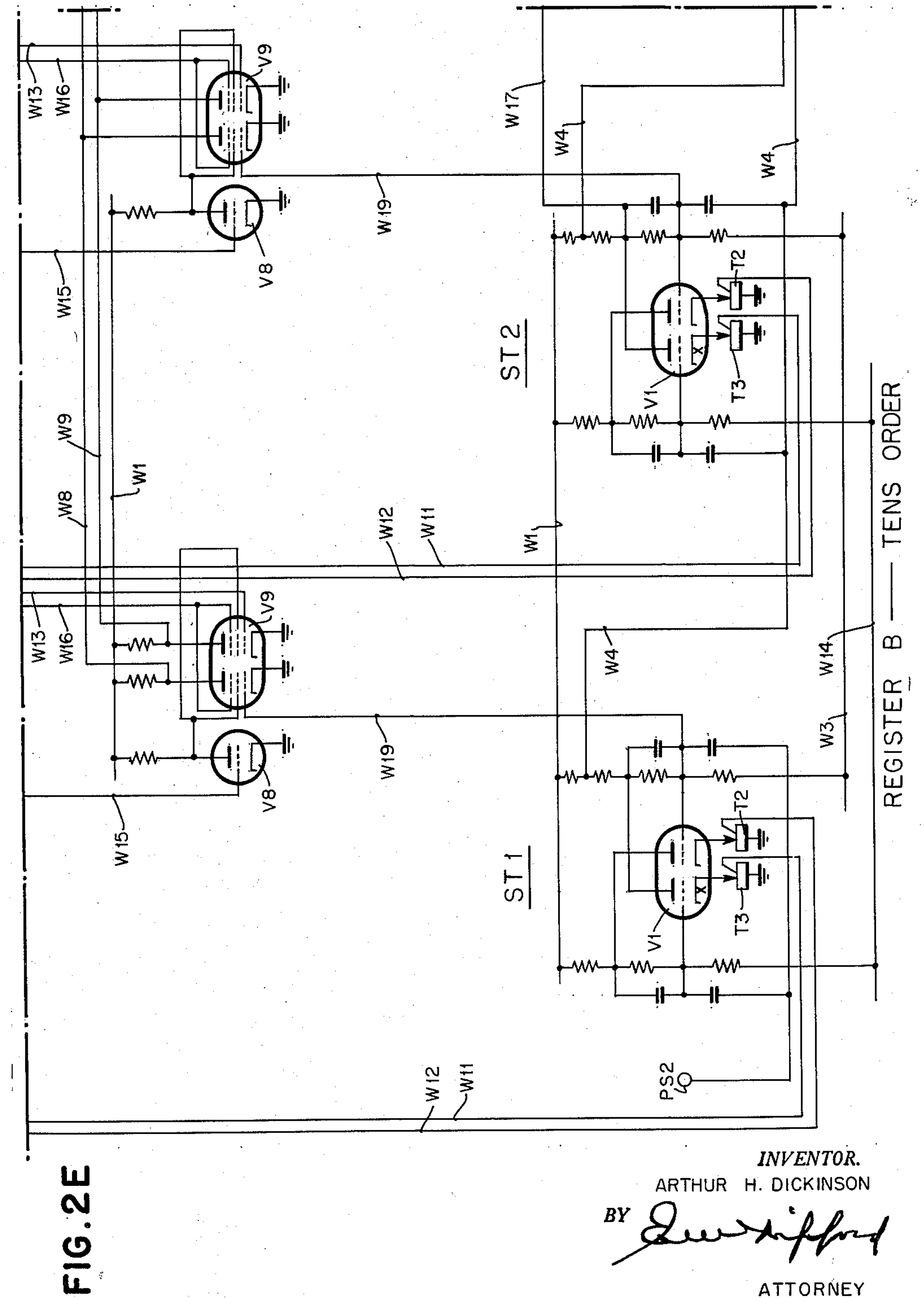
Figure 2F:
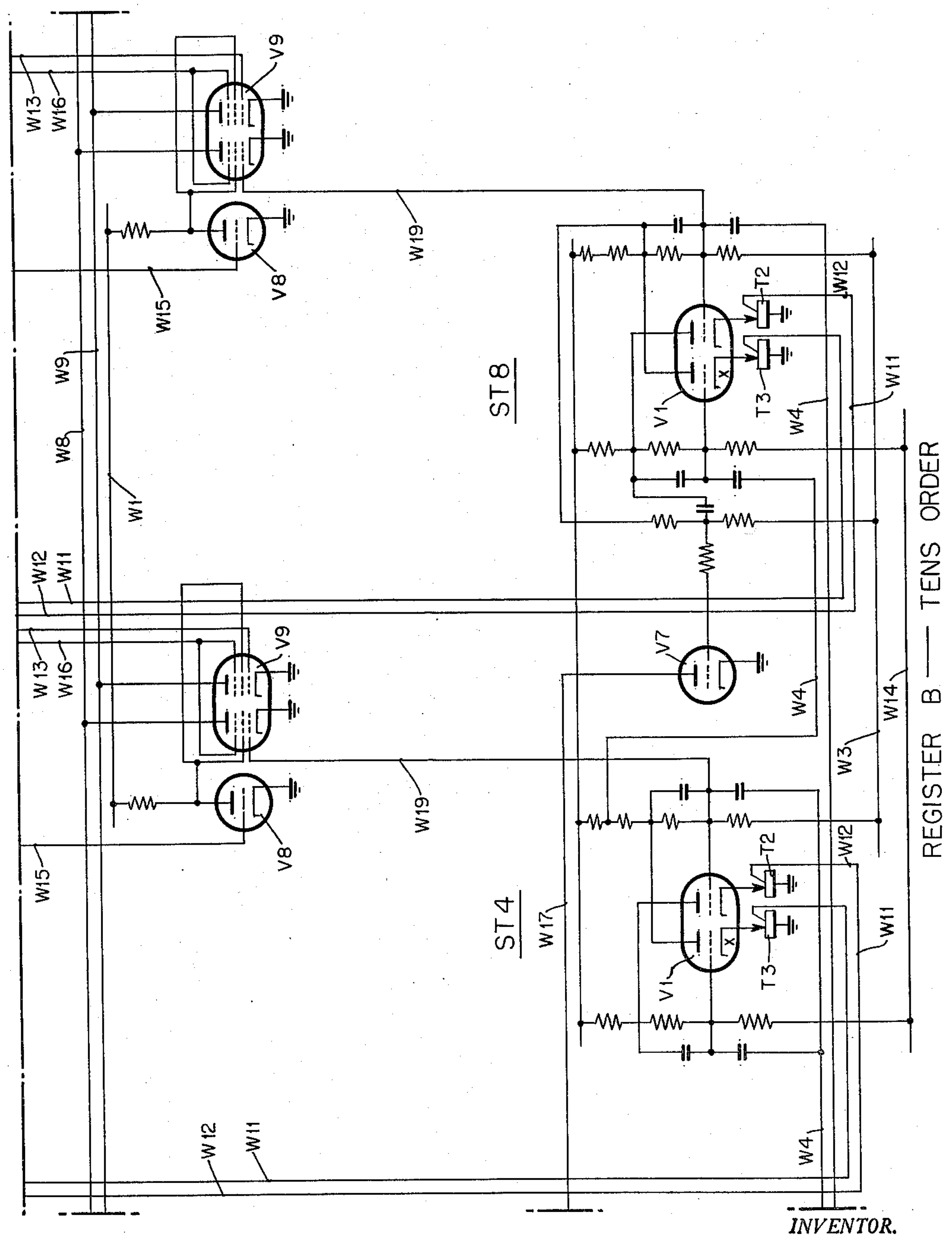
Figure 2G:
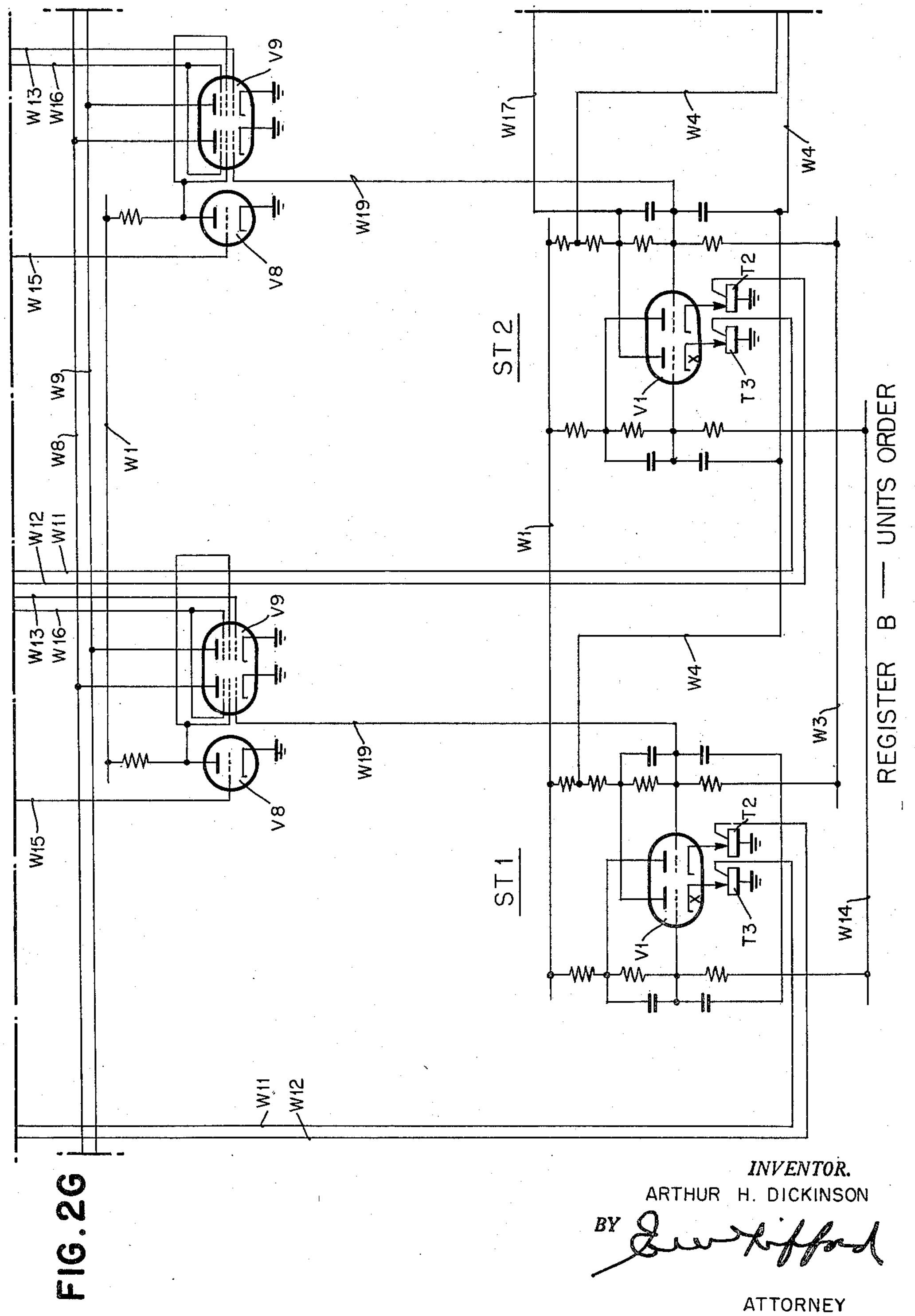
Figure 2H:
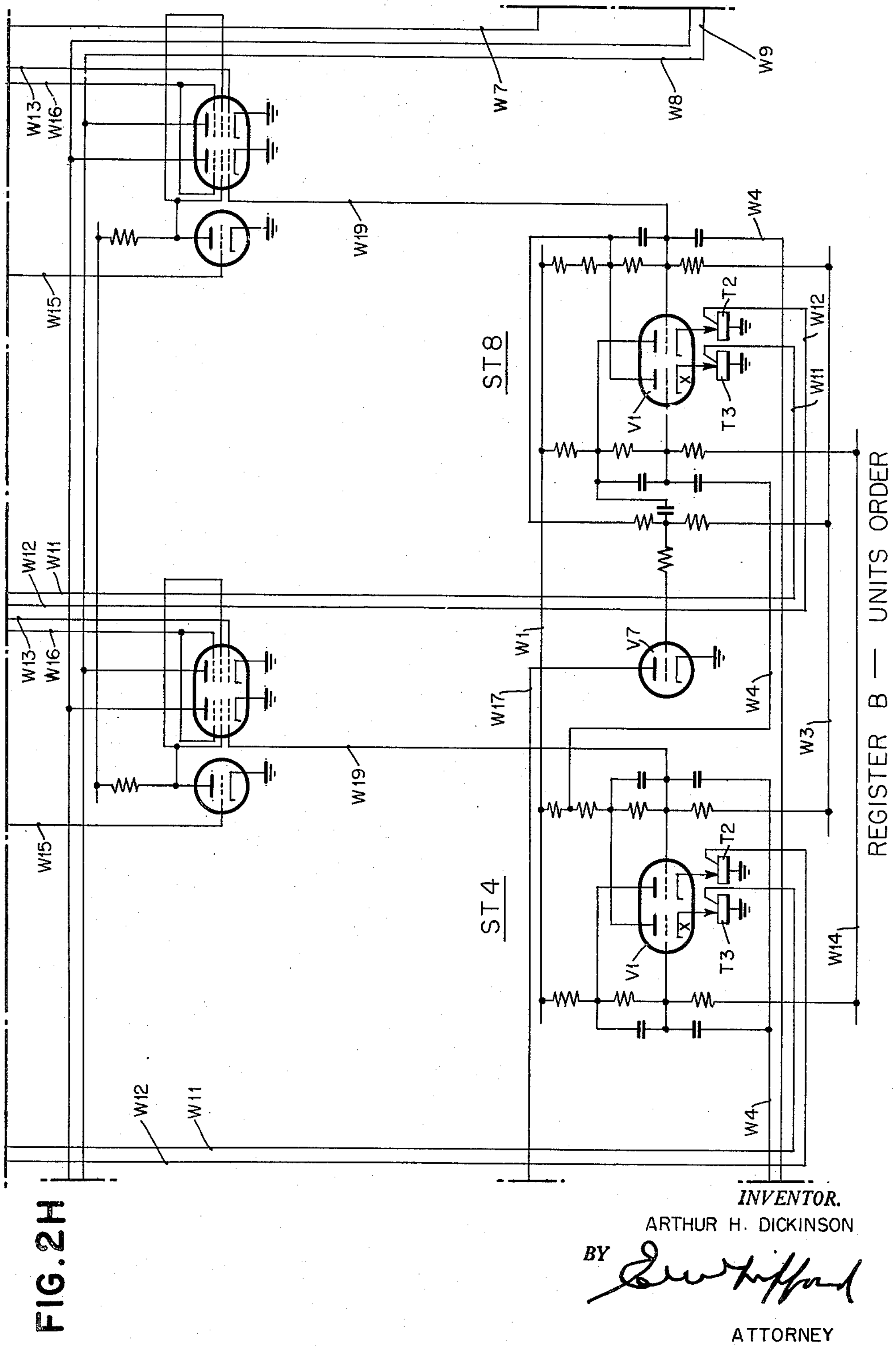

FIGS. 2A to 2H taken in conjunction with FIG. 1I comprise a wiring diagram showing how the invention may be applied to conventional binary registers using conventional Eccles-Jordan triggers.

Figure 3:
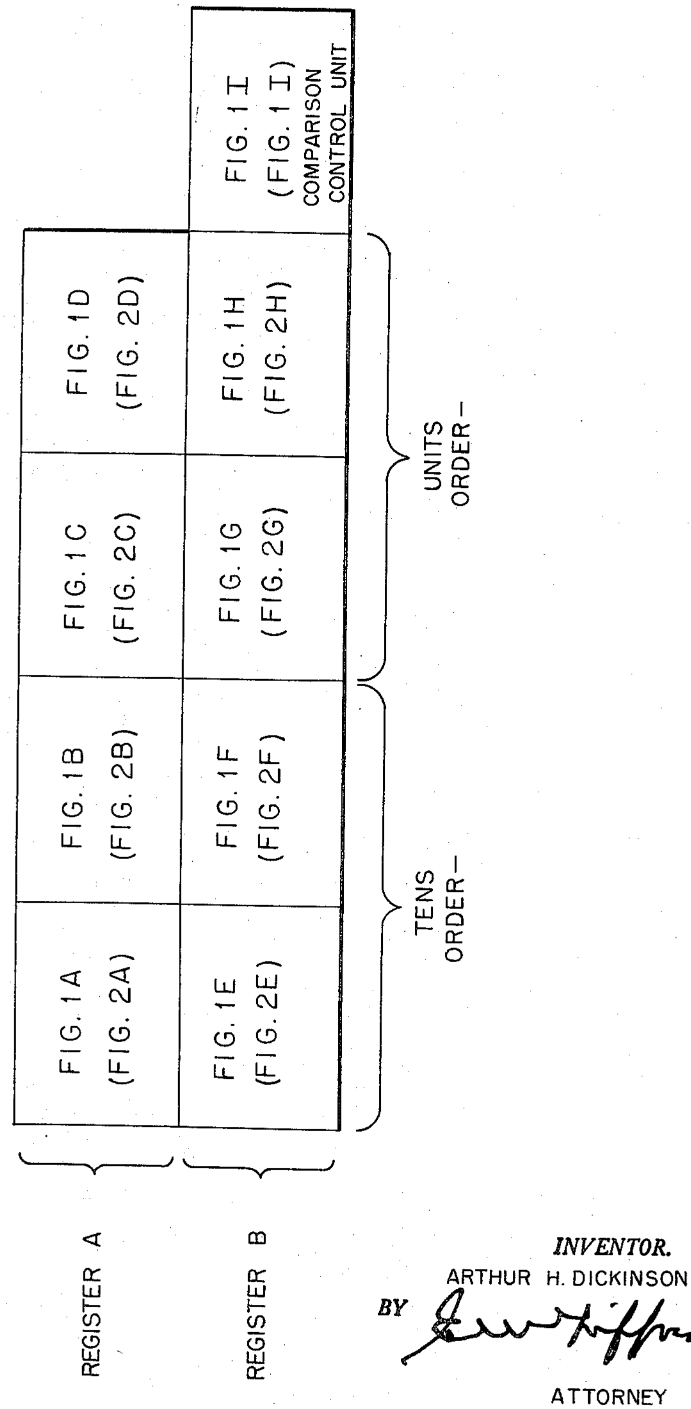

FIG. 3 is a chart showing how FIGS. 1A to 1I, in the case of the embodiment shown in those figures, and FIGS. 2A to 2H and 1I are arranged to form the respective wiring diagrams for the two forms of the invention.

The preferred form of the invention is disclosed in FIGS 1A to 1I in which the registers are of the form using semi-conductor translating devices in trigger circuits similar to the ones disclosed in application Serial No. 177,446 filed August 3, 1950, now Patent No. 2,872,592, by A. H. Dickinson. For sake of completeness, the basic trigger circuit of the registers will be described briefly before proceeding with a description of the invention forming subject matter of the present application.

It will be understood that the circuits disclosed herein are connected to a suitable power supply source through the positive power supply wire W1 for the tube anodes and the bias supply wire W3 for the grids. The cathodes are grounded to an intermediate point of the power supply.

In order to keep the wiring diagram within a reasonable size and the disclosure as concise as possible, only two denominational orders of two binary type registers have been disclosed in the drawings. It will be understood that the registers may comprise a larger number of denominational orders or that other types of registers, such as quinary registers, may be used merely by duplication of the basic trigger circuits and the cross-coupling transistor circuits which are employed in effecting the comparisons for relative magnitude of data stored in the registers.

In FIGS. 1A and 1B there are disclosed the four stages comprising a single denominational order of a binary decimal trigger register wired like the orders of the aforesaid application. These stages are designated ST1, ST2, ST4, ST8 in which the suffixes designate the binary bit values 1, 2, 4, 8. In the drawings two registers designated A and B of two denominational orders each are disclosed. The trigger stages ST1, ST2 of the tens order of register A is disclosed in FIG. 1A and the basic trigger circuit for a typical single stage ST1 comprises the transistor T1, the tube V1, the condensers C1, C2 and the diode D1. The transistors T2, T3 have been provided for the purpose of controlling the comparing circuits which will be described in detail hereinafter. For the moment, it will be assumed that the transistors T2, T3 are ineffective and the transistor T2 has zero resistance or is replaced by a fixed connection.

In order to understand the operation of the trigger, let it be assumed that the left hand tube V1 (FIG. 1A) is fully conductive, whereby the transistor T1 is fully conductive in its emitter circuit, the emitters of the transistors being indicated by the arrow-heads in the drawings. This causes a relatively stronger flow of current through the collector of transistor T1 and the adjustable resistance R2 causing the grid of the tube V1 to be considerably less negative, thereby tending to maintain the tube V1 in conduction. If now a negative pulse is applied from an external source to the plug socket PS1, as would be the case in entering a value in the register, the grid of the tube V1 will momentarily be made more negative through the condenser C2. This negative pulse has less effect on the anode of the tube V1 through the condenser C1 because the anode is already at a low potential due to the initial conducting status of the tube V1.

The negative pulse on the grid of tube V1 will cause it to become less conductive, thereby reducing the conductivity of the emitter circuit of transistor T1. This in turn reduces the flow of current through the resistor R2 and tends to drive the grid of the tube V1 even more negative. This action is accumulative, with the result that the tube V1 ultimately reaches cut-off and the grid thereof approaches the potential of the negative grid bias wire W3. This changes the trigger circuit from its initial stable stage to its alternate stable state.

When the next negative pulse is applied to the plug socket PS1, the anode side of the condenser C1 is made more negative and produces a momentary increase in current of the transistor T1. This, of course, tends to increase the flow of current through the resistor R2 and make the grid of the tube V1 more positive. This effect is accumulative, making the tube V1 more conductive, and through transistor T1, increasing the flow of current through the resistor R1 until the alternate stable state of the trigger circuit is reached.

The trigger circuits disclosed in the drawings were designed to be operated by square waves and in order to suppress the effect of the positive going portion of the square wave the diode D1 is provided which acts as a low resistance path for the positive going portion of the pulse and prevents the trigger circuit from being affected while the potential is rising at the common point of connection of the condensers C1, C2 and diode D1. The negative going portion of the pulse appearing between the plug socket PS1 and ground has the same effect as momentarily inserting a battery with its negative pole at the plug socket PS1 and positive pole at ground and thereby tends to make the base of the transistor T1 more negative through the coupling condenser C1, thus tending to increase the current flow in the emitter circuit. As has been seen, this produces an increase in current in the collector circuit.

The cathode of the tube V1 for stage ST1 is coupled to an input condenser C3 for the next higher stage ST2 whereby a negative pulse is applied to the grid or anode, as the case may be, of tube V1 for stage ST2 whenever the tube V1 becomes nonconductive. The respective stages ST1, ST2, ST4, ST8 are considered to be in "Off" status whenever the tubes V1 and transistor T1 are nonconductive and in "On" status when tube V1 and transistor T1 are fully conductive.

For the purpose of cross coupling the correspondingly valued stages of the registers A and B there are provided the transistors T2, T3 and the input resistances R3, R4 for tubes V2, V4. When the stage ST1 in FIG. 1A is in "On" state with tube V1 fully conductive, the emitter circuit of transistor T2 will likewise be fully conductive since it forms part of the cathode circuit of tube V1 with resistor R1. This causes maximum flow in the collector circuit of transistor T2 producing a maximum voltage drop across resistor R3. The line wire W2 to which the emitter of transistor T3 is connected is at a potential intermediate ground and the positive power supply line wire W1. The current flow through the resistor R1 raises the potential of the base of transistor T3 to a point close to the potential of wire W2, reducing the flow of current in the collector circuit of transistor T3 to a minimum. Thus, the voltage drop across resistor R4 is so low that the grid of tube V4 is held substantially at grid bias potential. Thus, tube V2 is rendered conductive and tube V4 nonconductive when stage ST1 (FIG. 1A) is in "On" status.

It will be noted in FIGS. 1A and 1E that the wire W11 which forms part of the collector circuit for transistor T2 of the stage ST1 of register A, also forms part of the collector circuit for the transistor T3 of stage ST1 of register B, and likewise, the wire W12 interconnects the collector of transistor T3 for stage ST1 of register A and the collector of transistor T2 for the stage ST1 of register B. In other words the resistors R3, R4 are each connected in common by one of the line wires W11, W12 to a pair of transistors comprising T2 in one stage and T3 in the opposite stage.

When no values are retained in either of registers A and B, all stages ST1, ST2, ST4, ST8 will be in "Off" status with tubes V1 cut off and transistors T1, T2 nonconductive and all transistors T3 conductive. This is indicated by the small "*x*" adjacent transistors T3. Tubes V2, V4 are then both conductive. Since the anode potentials of tubes V2, V4 will be low under this condition, tubes V3 will be at cut-off, and the high anode potential of tubes V3 will render gates V5 potentially conductive on the suppressor grids.

On the other hand, if the numbers retained in both registers are equal, correspondingly designated and associated stages of registers A and B will be either both "Off" or both "On." If both are 'Off," the corresponding tubes V2, V4 will be conductive and the related gate V5 conditioned for conduction as described above.

If both of two correspondingly designated stages are "On," transistors T2 will be fully conductive and T3 nonconductive. Again the tubes V2, V4 will be both conductive and the associated gates V5 conditioned for conduction.

It is clear that for an equal condition all gates V5 will be conditioned for conduction.

The gates V5 are tested sequentially by a succession of positive test pulses of which the first is applied to the highest order and highest bit valued gate of such order and progressively applied to the lowest orders, in each case being applied first to the highest bit valued gate. In the simple registers shown, the pulses progress in the following order: ST8, ST4, ST2, ST1 of the tens order, thence ST8, ST4, ST2, ST1 for the units order. While the testing takes place successively, in the strictest sense, the action occurs so rapidly as to be substantially instantaneous for practical purposes.

The first positive pulse, from a suitable source S (FIG. 1B), is applied to the control grid of the gate V5 associated with the stages ST8 of the tens order, the one at the extreme right in FIG. 1B, causing this gate to conduct. This produces a negative pulse which momentarily cuts off inverter V6, thereby producing a second positive pulse that is transmitted over wire W20 to the control grid of the gate V5 associated with the next stage ST4 on the left. Similar positive and negative pulses are produced in succession for tens stages ST2, ST1 in the order named and inverter V6 for tens stage ST1 produces a pulse on wire W18 (FIG. 1A) which is passed to the right to gate V5 of units stage ST8 (FIG. 1D). In similar fashion, positive and negative pulses are produced from right to left in FIGS. 1D, 1C, in the same order as from FIGS. 1B, 1A, the last negative pulse appearing on the anode of the gate V5 for units stage ST1 and wire W7. In FIG. 1I it will be seen that this negative pulse is applied to trigger V10, changing it from "Off" status, in which the left-hand triode is conductive (marked "*x*" in FIG. 1I) to "On" status. The increased current flow in the anode-cathode circuit of the right-hand triode of trigger V10 causes the "Equal" light L1 to become illuminated. The wire W14 is the usual reset bias line which is momentarily opened to reset triggers V10, V11, V12 to "Off" status once each cycle.

When the numbers stored in the register are not equal, in at least one stage the trigger will be "On" in one register and "Off" in the corresponding stage of the other register. In other words, the transistors T2, T3 will not be conductive in related pairs in related stages of the same order, and a test must be made to determine which of the stages is highest in value.

Since the numbers are represented in the illustrative embodiment by combinations of the binary bit values 1, 2, 4, 8, it is necessary in each denominational order to test the stages in the order ST8, ST4, ST2, ST1 beginning with the highest order. For the purpose of explaining in a simple manner how the inequality test is made, let it be assumed that units order stage ST1 of register A (FIG. 1C) has the value "1" stored represented by the conduction tube V1 and that the corresponding stage of register B is "Off" with associated tube V1 cut off. Under these conditions transistor T2 of stage ST1 in FIG. 1C is fully conductive and maximum current flows through the corresponding resistor R3 (FIG. 1C) thereby rendering tube V2 for stage ST1 conductive. In register B, however, tube V1 (FIG. 1G) is cut off and related transistor T3 (FIG. 1C) is conducting. This causes a greater current flow through the resistor R3, thus increasing the voltage drop across it and making the grid of tube V2 even more positive.

Since transistor T3 for stage ST1 of register A (FIG. 1C) is conducting at a minimum and the related transistor T2 for register B (FIG. 1G) also is conducting at a minimum, there will be no substantial current flow through resistor R4 and tube V4 will remain cut off. Thus, only one half of the tube V3 will be conductive and the potential on both of the anodes of the tube V3 will be held too low to condition the right tube V5 (FIG. 1C) for conduction.

It will be noted in FIGS 1C and 1G that the suppressor grids of the tubes V5 are connected by wires W15 to the grids of the tubes V8. Thus, if a tube V5 for units stage ST1 is maintained non-conductive by the condition just described, the related tube V8 will likewise remain nonconductive. Tube V8, however, will normally be conductive unless there is an inequality, since the grid of tube V5 normally is maintained high enough to cause conduction in both tubes V5, V8.

The anode of each tube V8 is coupled to both screen grids of an associated dual pentode gate V9. Thus, when there is an inequality condition in any of the stages of registers A and B, screen grids of the associated gate V9 will be primed. Since stage ST1 (FIG. 1C) is to be "On" to represent the value "1," the grid of tube V1 will be at a relatively high potential and is connected by wire W13 to the control grid of the right hand half of dual gate V9, (FIG. 1G). Thus the right hand half of gate V9 is conditioned for conduction and the positive test pulse which appears on the wire W20, as described above, will be ineffective insofar as the left hand tube V5 (FIG. 1C) is concerned but will be transmitted over left hand wire W16 to the suppressor grids of tube V9 (FIG. 1G). Thus the right hand half of gate V9 will be rendered fully conductive and will produce a negative pulse on wire W9 in consequence of the fact that the anode potential of the left hand half of gate V9 falls. It will be noted in FIG. 1I that this negative pulse appearing on wire W9 will be applied to the left hand side of the "high" trigger V12, thus turning the trigger "On" and causing the "high" lamp L3 to light. This indicates that register A is higher in value under the assumed condition than register B.

Now let it be supposed that the condition is reversed and that units order stage ST1 (FIG. 1D) for register B is "On" and the corresponding stage ST1 of register A "Off." This will reverse the conditions by causing tube V4 to conduct and tube V2 to be cut off. This, of course, has the same effect on the gate V5 but it will be noted that the control grid of tube V1 in stage ST1 of register B (FIG. 1G) is connected by wire W19 to the control grid of the left hand half of gate V9. Thus the positive pulse on wire W20 causes a negative pulse to appear on wire W8 which, as will be clear from FIG. 1I, turns the low trigger "On" and illuminates the "low" light L2.

The foregoing description has taken a simple case in which the difference lies in the units order and all of the other stages were assumed to be "Off" to represent zero. Since the testing starts with the highest valued bit stage in the highest order, the inequality which appeared in the stages ST1 for the units order determined the status of the comparison triggers and indicators in FIG. 1I. The significant fact to be kept in mind is that the gates V9 for each order are selectively controlled through the wires W13, W19 to determine which of the corresponding stages in the registers is the highest.

In order to understand the overall effects produced by the cross-coupling transistors T2, T3, the resistances R3, R4, and the tubes V2 to V6, V8, and V9 when the numbers are unequal, it now will be assumed that the value 51 has been stored in register A and the value 38 in register B. The following table shows the states of the various elements in the two orders and the potentials on the wires W11, W12 and the anodes of the tubes V2, V3, V4:

REGISTER A—VALUE 51

| Order | Tens | | | | Units | | | |
|---|---|---|---|---|---|---|---|---|
| Stages | ST1 | ST2 | ST4 | ST8 | ST1 | ST2 | ST4 | ST8 |
| Triggers | X | O | X | O | X | O | O | O |
| Tube V1 | C | NC | C | NC | C | NC | NC | NC |
| Transistor T2 | C | NC | C | NC | C | NC | NC | NC |
| Transistor T3 | NC | C | NC | C | NC | C | C | C |
| Wire W11 | H | L | H | H | H | H | H | L |
| Wire W12 | H | H | L | H | L | H | H | H |
| V2 Anode | L | H | L | L | L | L | L | H |
| V3 Anode | H | L | L | H | L | H | H | L |
| V4 Anode | L | L | H | L | H | L | L | L |
| V5 Status | C | NC | NC | C | NC | C | C | NC |
| V8 Status | NC | C | C | NC | C | NC | NC | C |
| V9 Right | NC | NC | C | NC | C | NC | NC | NC |
| Left | NC | C | NC | NC | NC | NC | NC | C |

REGISTER B—VALUE 38

| | | | | | | | | |
|---|---|---|---|---|---|---|---|---|
| Triggers | X | X | O | O | O | O | O | X |
| Tube V1 | C | C | NC | NC | NC | NC | NC | C |
| Transistor T2 | C | C | NC | NC | NC | NC | NC | C |
| Transistor T3 | NC | NC | C | C | C | C | C | NC |

O—"Off"; X—"On"; C—Conducting; NC—Nonconducting; H—High Potential; L—Low Potential.

In the description of the operation under conditions of equality of registers A and B it was pointed out that the positive test pulses apeparing on wire W20 are first introduced at the control grid of the tube V5 corresponding to the highest valued stage ST8 in the highest or tens order. With reference to the foregoing table, it will be noted that the tens order stage ST8 is "Off"; consequently, the positive test pulses can progress only as far as stage ST4 which is "On" in register A, this order containing the value "5" represented by the combination of "1" and "4." Stage ST4 in register B is "Off"; consequently, the situation is the same as was discussed above wherein it was assumed that register A retained the value "1" and register B, "0," in the units order. The potential on wide W11 and the grid of tube V2 at the left in FIG. 1B will be high since transistor T2 is now conductive, thus rendering the tube V2 conductive. Tube V4 will be nonconductive since the tube V1 for stage ST4, Register B, is in nonconducting, or "Off" status. The high anode potential of tube V4 will cause the tube V3 to conduct and maintain the associated gate V5 at cut off. This prevents the positive pulses from continuing to the lower valued stages of the highest order and to the stages of the lowest order. The tube V8 will be conductive and condition the screen grids of the dual gate V9 for conduction of the gate. Since tube V1 of stage ST4 in FIG. 1B is conducting with its control grid at higher potential, the right-hand half of gate V9 is primed for conduction at the control grid. Consequently, the positive pulse appearing on wire W20 is communicated by the left-hand wire W16 in FIGS. 1B and 1F to the right-hand half of gate V9 causing it to conduct. This produces a negative pulse on wire W9 which puts trigger V12 in "On" status and illuminates lamp L3 to indicate that that register A is high. Since the further progress of equal pulses over the wires W7, W8, W18 and W20 is blocked owing to the gate V5 corresponding to stage ST4 in FIG. 1B being nonconductive, the stage ST4 dominates over lower valued stages in the same and lower orders.

When the tens order registers values which are equal or both zero, the positive test pulses will not be blocked by any of the gates V5 for the tens order and will continue over the wire W18 to the highest valued stages ST8 of the lowest order. In the illustrative case shown by the above table, the numerical relation in the units order is reversed. In this case, since the stage ST8 of register B is "On" in the units order, the situation just described in reference to the tens order is reversed and the left-hand half of gate V9 at the right in FIG. 1H will be primed for conduction producing a negative pulse on wire W8 which will cause the low trigger V11 to be turned "On." This action cannot take place when the values in the higher order are unequal for the reason, pointed out above, that the gate V5 corresponding to the stage in which the inequality is manifested will block the passage of the test pulses to the lower order.

For the purpose of causing the register orders to operate in accordance with the decimal system, there are provided the blocking tubes V7, (FIGS. 1B, 1D, 1F, 1H) and the diodes D2 which function in the manner disclosed in the foregoing application, to effect a decimal correction to add "6" whenever the "8" trigger is switched to "On" status. It will be understood, however, that the invention is not limited to a decimal-type register but is equally applicable to a straight binary register, for example, merely by increasing the number of binary stages. Thus, in FIG. 1B, for example, the wiring associated with the right hand stages ST8 and the associated tubes V2 to V6, V8, and V9 may be duplicated at the right as many times as desired to provide for additional powers of "2" in the binary system without changing the pattern of wiring.

It is also possible to apply the invention to a conventional Eccles-Jordan type of binary or quinary register. FIGS. 2A to 2H in combination with FIG. 1I arranged as shown in FIG. 3 by the captions in parentheses illustrate the application of the invention to a binary Eccles-Jordan type register. It will be noted in FIG. 2A that the wiring of the tubes V2 to V6, V8, V9 in the same as in FIG. 1A and the designations of wires W11, W12 have been reversed in relation to the triggers in consequence of the fact that the left hand sides of tubes V1 are conductive in the "Off" state of the triggers as indicated by the small "x" adjacent the cathodes. In FIG. 1A the corresponding relationship is indicated by a small "x" adjacent the transistors T3. When the triggers are all "Off" in FIGS. 2A to 2H, the transistors T3 will have maximum conduction and tubes V2, V4 will be conductive cutting off tube V3 and priming the gates V5.

In FIG. 1I there has been shown a very simple means of indicating the numerical relationship between the two registers which consists of the lamps L1 to L3. In a practical computer or other machine in which the invention might be incorporated, triggers V10 to V12 will be coupled to suitable gates or other electronic devices which will control the functioning of the equipment according to the purposes for which the comparison is effected. A practical application of the circuit described herein would lie in a type of machine well known as a collator in which numbers represented by perforations in cards are compared in various ways, such as for the purpose of filing cards, and in such case the triggers V10, V12 will control suitable gas tubes having comparison relays representing "high," the "low," and "Equal" condition which, in turn, control the feeding of the records and the pocket selection devices in a well known way. Values may be entered in the registers in any well known way such as by means of suitable read-in triggers and gates controlled by the card sensing brushes or other sensing means of a record card controlled machine. For this purpose the plug sockets PS1 are provided.

Since the representation of data in the registers A and B in the binary system is essentially a code form of representation, the invention is well suited for comparison of other types of data than numerical. For example, the triggers in FIGS. 1A and 1B could be set in accordance with a combinational-hole form of code representation of alphabetic data or arbitrary character data, it only being essential that the code used be designed so that the triggers ST1, ST2, ST4, ST8, etc., be turned "On" in accordance with the sequential system or order of the code in which the stage ST8 has the highest value in sequence and the stage ST1 the lowest value.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic data processing machine, a pair of electronic registers, each having a plurality of orders, each order having a series of bistable trigger stages representing by a predetermined stable state the bit values of a binary system of numbers; a series of electronic gates, each associated with a related pair of stages in related orders, one from each register, corresponding to the same bit value; a single pair of control circuits for each gate, each circuit including a semiconductor translating device responsive to one stable state of one of the associated stages and another semiconductor translating device responsive to the other stable state of the other stage, the other control circuit including a pair of semiconductor translating devices responsive to the stable states opposite those controlling the first said circuit, both said circuits being rendered operative when the corresponding stages are in the same stable state, circuit means responsive to both pairs of control circuits and its gate for opening said gate when the related stages are in the same state, circuit means for coupling the output of each gate with the input of the gate of next lowest bit value in each order and the output of the lowest bit value gate for each order to the input of the highest bit valued gate of the next lowest order, means for applying a test pulse to the input of the highest bit valued gate in the highest order, and means connected to the output of the lowest bit valued gate in the lowest order for manifesting the fact that all of the gates are open.

2. In an electronic data processing machine, two series of trigger stages, each stage representing one of the different component values of a series of numbers by a predetermined one of two stable states; a series of gate tubes, each having a control input, a test pulse input and a pulse output, each gate tube corresponding to a related pair of said trigger stages, one from each series, representing the same component value; pairs of cross-coupling circuits, one pair for each of said gate tubes each circuit of a pair including a pair of transistors one of which is responsive to one stable state of one corresponding stage and the other responsive to the alternate stable state of the other corresponding stage, the transistors of the remaining control circuit being responsive to the remaining stable states of the corresponding stages, coincidence circuit means for coupling each pair of control circuits to the control input of the associated gate tube and operative to render the gate tube conductive when corresponding stages of a related pair are in the same stable state, means to apply a test pulse to the pulse input of the gate tube for the stages of the highest component value, circuit means coupling the pulse outputs of the gate tubes to the pulse inputs of the gate tubes for the next lowest component values, and means responsive to the pulse output of the gate tube associated with stages of lowest component value for manifesting that all related pairs of stages are in identical stable states.

3. In an electronic data processing machine, two series of electronic register stages, each series of stages representing a series of component values of a number system by a predetermined one of two stable states, each stage of one of said series being paired with the stage of same component value in the other series; a series of switch tubes, one for each component value, each switch tube being associated with the one pair of stages of same component value and having a control input for rendering the switch tube effective, a test pulse input and a pulse output, the puse outputs of the switch tubes being coupled to the test pulse inputs in inverse order of the component values, beginning with the switch tube of highest component value and terminating with the switch tube of lowest component value; a series of pairs of cross-coupling circuits, a single pair for each switch tube and its related pair of stages, each circuit including means responsive to two different changes of state of a related pair of stages whereby both circuits of the pair are activated when both stages of the related pair of stages are in the same state, and electronic coincidence circuit means connecting each pair of circuits to the control input of the related switch tube to render said tube effective when the related pair of stages is in a common state.

4. In an electronic data processing machine, a pair of registers, each having a series of trigger stages representing, by different stable states, the different component values of a number system; a pulse source, an equal designating device, an equal circuit having a series of electronic switch tubes, one for each component value, and connected in a separate cascade circuit between said source and said device, each tube having a separate switching pulse input; a series of pairs of load resistors, a single pair for each separate component value; electronic means for coupling the two stages representing the same component value to a corresponding pair of said resistors, and operative to produce similar voltage changes on said pair of resistors when both of the stages are in identical stable states, and a series of coincidence circuits, one for each pair of resistors, each coincidence circuit having two inputs connected to said pair of resistors and having an output connected to the pulse input of the associated switch tube to render said switch tube operative when both stages for the same component value are in identical stable states.

5. In an electronic data processing machine, two electronic registers, each comprising a series of trigger circuits, each circuit having a plurality of stable states designating component values and represented by a plurality of different potentials at different points in each trigger circuit; an equal circuit comprising a series of electronic switching devices separately connected in cascade each switching device having a control input for rendering the switching device effective, each switching device being associated with two pairs of potential points, one pair in each register, representing the same component value; and a series of coincidence circuit, one circuit for each switching device and component value for coupling the associated pairs of potential points to the control input of such switch, said series of coincidence circuits being operative, when both registers are in identical stable state, stage-for-stage, to render the switching devices effective in cascade to complete said equal circuit.

6. In an electronic data processing machine, a pair of registers, each having means for producing potential changes designating component values of a number system, said values being represented by predetermined changes in potential at designated points, which, in each register, are paired with and correspond to similar points in the other register; a series of groups of resistive loads, transistors having connections to said points and to said loads for producing a pair of comparative potential changes which indicate the relation between the values designated by the respective registers, a series of electronic coincidence circuits one for each pair of similar points for evaluating said comparative potentials for identity of representation of the registers; and three separate electronic switching circuits, one responsive to identical potentials compared by said coincidence circuits to manifest identity of designation of the registers, and the other two being responsive to differences in the potentials at said points, and rendered effective by the coincidence circuits to manifest which of the registers designates the greater value.

7. In an electronic data processing machine, two registers, each having a series of circuits representing the presence or absence of component values of a number system by two different potentials at different points in each of said circuits; pairs of circuits for cross coupling the potential points which designate the presence of a component value in one register with the corresponding points representing absence of a value in the other register; coincidence circuits, one for each pair of cross coupling circuits, each having an output potential denoting identity of designated value; two separate series of switching devices connected in cascade, one series for each register, one of said devices in each series being paired with a device in the other series and associated with a pair of related potential points, each pair of devices being controlled both by the potentials at said points and by the output potential of a related one of the coincidence circuits; and two separate inequality circuits, one for each series of devices and selectively closed by one of said devices when the register corresponding to said series contains a higher value than the other register.

8. A pair of registers, each comprising a plurality of polystable trigger circuits, each trigger circuit of one register being paired with a trigger circuit of the other and in one stable state representing the same component value and in another stable state representing zero; a series of pairs of load resistors, one pair for each pair of trigger circuits; electronic means for cross coupling said trigger circuits to said load resistors and operative to produce a potential change of predetermined value on both resistors of a pair when both of the trigger circuits associated therewith are in the same stable state; a separate series of switch tubes, each having a test pulse input and a test pulse output and connected in cascade through said inputs and outputs, one of said switch tubes being associated with each pair of resistors, electronic coincidence means for coupling each pair of resistors to one of said switch tubes and operative to render a switch tube effective to pass test pulses only when the predetermined voltage change occurs on both resistors of a pair, a pulse source connected to the test pulse input for the switch tube corresponding to the highest component value, and a device connected to the test pulse output for the switch tube of lowest component value and rendered operative in response to a cascaded pulse from said source through said switch tubes to manifest the fact that all of the corresponding trigger circuits of said registers are in the same stable state.

References Cited in the file of this patent

UNITED STATES PATENTS

| | | |
|---|---|---|
| 2,511,996 | Robineau | June 20, 1950 |
| 2,580,768 | Hamilton et al. | Jan. 1, 1952 |
| 2,623,170 | Dickenson | Dec. 23, 1952 |
| 2,623,171 | Woods-Hill | Dec. 23, 1952 |
| 2,641,696 | Woolard | June 9, 1953 |
| 2,712,065 | Elbourn et al. | June 28, 1955 |
| 2,749,440 | Cartwright | June 5, 1956 |
| 2,877,445 | Cheilik | Mar. 10, 1959 |

FOREIGN PATENTS

| | | |
|---|---|---|
| 688,049 | Great Britain | Feb. 25, 1953 |